(12) United States Patent
Conroy et al.

(10) Patent No.: US 9,052,395 B2
(45) Date of Patent: Jun. 9, 2015

(54) RESONANT MODULATION FOR LOW POWER RANGE IMAGING CAMERAS

(75) Inventors: Richard Michael Conroy, Hamilton (NZ); Adrian Andrew Dorrington, Hamilton (NZ); Cyrus Bamji, Fremont, CA (US)

(73) Assignee: WaikatoLink Limited, Hamilton (NZ)

( * ) Notice: Subject to any disclaimer, the term of this patent is extended or adjusted under 35 U.S.C. 154(b) by 133 days.

(21) Appl. No.: 13/458,833

(22) Filed: Apr. 27, 2012

(65) Prior Publication Data

US 2012/0307229 A1  Dec. 6, 2012

Related U.S. Application Data

(60) Provisional application No. 61/480,879, filed on Apr. 29, 2011.

(51) Int. Cl.
| | |
|---|---|
| *G01C 3/08* | (2006.01) |
| *G01S 17/89* | (2006.01) |
| *G01S 17/36* | (2006.01) |
| *G01S 7/491* | (2006.01) |
| *H04N 5/376* | (2011.01) |

(Continued)

(52) U.S. Cl.
CPC ............. *G01S 17/89* (2013.01); *G01S 17/36* (2013.01); *G01S 7/4915* (2013.01); *H04N 5/3765* (2013.01); *G01S 7/4914* (2013.01)

(58) Field of Classification Search
CPC ......... G01S 17/36; G01S 17/89; G01S 7/497; G01S 17/32; G01C 3/08
USPC ......... 356/3.01, 4.01, 4.07, 5.01, 5.1, 5.09, 9, 356/625; 250/214, 214.1
See application file for complete search history.

(56) References Cited

U.S. PATENT DOCUMENTS

| | | | | |
|---|---|---|---|---|
| 4,496,056 A | * | 1/1985 | Schoenig et al. | 209/539 |
| 5,872,489 A | * | 2/1999 | Chang et al. | 331/179 |

(Continued)

FOREIGN PATENT DOCUMENTS

| | | |
|---|---|---|
| CN | 1233323 A | 10/1999 |
| CN | 101151891 A | 3/2008 |

(Continued)

OTHER PUBLICATIONS

International Search Report and Written Opinion received for PCT Patent Application No. PCT/US2012/035594, mailed on Jun. 5, 2012, 9 pages.

(Continued)

*Primary Examiner* — Luke Ratcliffe
*Assistant Examiner* — Samantha K Abraham
(74) *Attorney, Agent, or Firm* — Morrison & Foerster LLP

(57) ABSTRACT

An amplitude modulated continuous wave range imaging device has a signaling device configured to emit an intensity modulated illumination signal. An image sensor is configured to capture a plurality of images of a reflection of the modulated illumination signal. The captured images include intensity and/or phase components for a plurality of pixels of the image sensor. Each pixel includes a first modulation terminal having a first capacitive component. A first driver is configured to charge a first set of modulation terminals of the plurality of pixels. A second driver is configured to charge a second set of modulation terminals of the plurality of pixels. A charge transfer circuit is connected between the first set of modulation terminals and the second set of modulation terminals. The charge transfer circuit is configured to transfer charge between the first set of modulation terminals and the second set of modulation terminals.

26 Claims, 16 Drawing Sheets

(56) References Cited

U.S. PATENT DOCUMENTS

| | | | |
|---|---|---|---|
| 6,765,393 B2 * | 7/2004 | Pierenkemper et al. | 324/635 |
| 6,882,246 B2 * | 4/2005 | Marquardt et al. | 333/174 |
| 7,696,805 B2 * | 4/2010 | Thorp et al. | 327/333 |
| 2005/0092897 A1 | 5/2005 | Schwarte | |
| 2005/0270537 A1 * | 12/2005 | Mian et al. | 356/437 |

FOREIGN PATENT DOCUMENTS

| | | |
|---|---|---|
| EP | 0513717 A1 | 11/1992 |
| EP | 1865714 A1 | 12/2007 |
| WO | 2011/020629 A1 | 2/2011 |

OTHER PUBLICATIONS

International Preliminary Report on Patentability received for PCT Patent Application No. PCT/US2012/035594, mailed on Nov. 7, 2013, 7 pages.

Extended European Search Report (includes Supplementary European Search Report and Search Opinion) received for European Patent Application No. 12777066.7, mailed on Nov. 25, 2014, 8 pages.

Office Action Received for Chinese Patent Application No. 201280032225.4, mailed on Feb. 2, 2015, 30 pages (16 pages of English Translation and 14 pages of Official Copy).

\* cited by examiner

RESONANT MODULATION FOR LOW POWER RANGE IMAGING CAMERAS

CROSS-REFERENCE TO RELATED APPLICATIONS

This application claims the benefit under 35 USC 119(e) of U.S. Provisional Patent Application No. 61/480,879, filed Apr. 29, 2011, which is incorporated herein by reference in its entirety for all purposes. The disclosure of PCT Application No. PCT/US2012/035594, filed Apr. 27, 2012, entitled "RESONANT MODULATION FOR LOW POWER RANGE IMAGING CAMERAS," is also hereby incorporated by reference in the present disclosure in its entirety for all purposes.

FIELD OF INVENTION

This disclosure relates generally to a range imaging camera, and specifically to a circuit configuration for reducing power consumption and controlling the effective range of a range imaging camera.

BACKGROUND OF INVENTION

Range imaging systems, also referred to as range cameras, range imaging cameras, or ranging devices, determine both distance and intensity for objects in a scene to be imaged. One type of range imaging camera is known as a time-of-flight range imaging camera because it utilizes the phase and intensity differences in reflected light to determine the range of objects from the camera.

One common type of time-of-flight range imaging cameras utilizes Amplitude Modulated Continuous Wave ("AMCW") technology. As discussed in more detail below, range imaging cameras utilizing AMCW technology, typically use a light source to emit an intensity modulated illumination signal to illuminate a scene to be imaged. The signal is then reflected back to the range imaging camera by objects within the scene. Multiple images of the reflected light are then captured by a specialized device, such as a charge-coupled device ("CCD") or a complementary metal oxide semiconductor ("CMOS") image sensor integrated circuit ("IC"). A processor is then used to calculate the phase change of the intensity modulated light from these multiple images for points across the imaged scene by comparing to a global reference modulation signal. These phase changes are then analyzed to determine the distance between the objects and the range imaging camera, thereby enabling the determination of the size, shape, and location of the objects in the scene. Range imaging cameras are therefore very useful in many varied applications such as automotive safety and control systems, multimedia user interfaces, and image segmentation and surface profiling.

Effective determination of the distance between a range imaging camera and an object to be imaged depends on the phase difference between the emitted intensity modulated illumination signal and the received signal. Because the image sensor and the illumination are generally modulated with the same signal, as light travels away from a range imaging camera, that light begins to slip out of phase with the modulation of the image sensor. Consequently, the shorter the distance traveled by the light, the more in-phase the light will be. In other words, light reflected from objects close to the range imaging camera has an intensity modulation that is in-phase with the modulation of the range imaging camera, while light reflected from distant objects has an intensity modulation that is out of phase with the image sensor. While the same signal is commonly used to modulate both the illumination signal and the image sensor, different signals may be used in some situations to achieve similar results.

While there are many ways to implement typical range imaging cameras, FIG. 1 has been provided to show a simplified version of one such range imaging camera. As shown in FIG. 1, a typical AMCW range imaging camera 100 may include a signalling device 101, such as an LED, laser diode, or other light source, to emit an intensity modulated illumination signal towards a scene to be imaged and an image sensor 102 to capture images using the portions of the emitted signal that are reflected back to the system 100 from the objects within the scene. A processor 103 then compares the emitted signal with captured images to determine the intensity and the phase shift for each pixel in the captured image. By doing so, the processor is able to determine the distance objects in the scene are from the system 100. The system 100 may optionally contain an input device 104 to control the system 100, a display 105, and a memory 106. These devices may be chosen from among any of the known devices for performing such functions. There are many known ways of modulating the signalling device 101 and the image sensor 102. For example, the signalling device may simply be a light source that is cycled on and off very quickly, while the image sensor 102 may be modulated using a high speed shutter or by controlling the image sensor. The processor 103 may also include a signal generator, or a similar device, to assist in modulating the signalling device 101 and the image sensor 102. However, a signal generator may also be separately provided.

As with a digital photograph, the captured images will typically be formed by an array of pixels, with objects in the scene being effectively mapped onto the pixel array. Unlike a typical digital image, the pixels of a range imaging camera will record not only the illumination intensity (which may include the color) of the light reflected from an object in a scene, but also the phase of the illumination modulation envelope. Accordingly, each of the pixels in a captured image will measure a phase component that is based on the light reflected back to that pixel by objects in the scene. Similarly, the phase will change slightly between corresponding pixels in consecutively captured images due to the continuous nature of the AMCW intensity modulation. Furthermore, pixels that correspond to areas of the scene that do not have objects in them will not receive a reflected signal, but will only receive ambient light or light reflected from another source (such as the sun). Typical range imaging camera sensors include background or DC rejection circuitry that allows more efficient use of the sensor's dynamic range for capturing the modulated light; therefore, background light is effectively ignored by the sensor. The invention is more specifically directed to the image sensors used in range imaging cameras.

SUMMARY OF THE INVENTION

Various exemplary embodiments of the invention include an amplitude modulated continuous wave range imaging device, having: a signaling device to emit an intensity modulated illumination signal; an image sensor to receive a reflection of the modulated illumination signal, the image sensor comprising a plurality of pixels, each pixel comprising a plurality of capacitive regions, wherein the plurality of pixels are configured to capture a plurality of images of the reflected modulated illumination signal, the captured images comprising intensity and phase components; a plurality of drivers, each driver configured to drive a respective capacitive region, or group of capacitive regions, of each of the plurality of pixels; at least one inductor connected between the capacitive regions of the plurality of pixels to form a resonant circuit; and a processor to determine a phase shift between the emitted illumination modulation signal and the captured images at each of the plurality of capacitive regions.

Additional configurations may include the at least one inductor comprising a plurality of inductors connected in series, wherein the plurality of inductors are connected by a plurality of switches. Also, the processor may be configured to control the plurality of switches to selectively connect the plurality of inductors. In some devices the at least one inductor may include a plurality of inductors connected in parallel, and the plurality of inductors may be connected by a plurality of switches. The processor may also be configured to control the plurality of switches to selectively connect the plurality of inductors. The at least one inductor may be a variable inductor. Additionally, the processor may be configured to control the inductance of the variable inductor.

According to further embodiments of the invention, an amplitude modulated continuous wave range imaging device may include: a plurality of signaling devices, each signaling device to emit an intensity modulated illumination signal; an image sensor to receive reflections of the modulated illumination signals, the image sensor comprising a plurality of pixels, each pixel comprising a plurality of capacitive regions, wherein each of the plurality of capacitive regions is configured to capture a plurality of images of the reflected modulated illumination signal emitted by one of the plurality of signaling devices, the captured images comprising intensity and phase components; a plurality of drivers, each driver configured to drive a respective capacitive region of each of the plurality of pixels; at least one inductor connected between the capacitive regions of the plurality of pixels to form a resonant circuit; and a processor to determine a phase shift between the emitted illumination modulation signal and the captured images at each of the plurality of capacitive regions. In such devices, the at least one inductor may include a plurality of inductors connected in series, and the plurality of inductors may be connected by a plurality of switches. The processor may be configured to control the plurality of switches to selectively connect the plurality of inductors. Additionally, the at least one inductor may include a plurality of inductors connected in parallel by a plurality of switches. In these devices, the processor may also be configured to control the plurality of switches to selectively connect the plurality of inductors.

Additional amplitude modulated continuous wave range imaging devices may include: a signaling device to emit an intensity modulated illumination signal; a plurality of image sensors to receive reflections of the modulated illumination signal, each of the image sensors comprising a plurality of pixels, wherein each of the image sensors is configured to capture a plurality of images of the reflected modulated illumination signal, the captured images comprising intensity and phase components; a plurality of drivers, each driver configured to drive a respective one of the image sensors; at least one inductor connected between the plurality of image sensors to form a resonant circuit; and a processor to determine a phase shift between the emitted illumination modulation signal and the captured images. In some such devices, the at least one inductor may include a plurality of inductors connected in series or in parallel by a plurality of switches. In these devices, the processor may be configured to control the plurality of switches to selectively connect the plurality of inductors.

An additional configuration of an amplitude modulated continuous wave range imaging device has a signaling device configured to emit an intensity modulated illumination signal. An image sensor is configured to capture a plurality of images of a reflection of the modulated illumination signal. The captured images include intensity and/or phase components for a plurality of pixels of the image sensor. Each pixel includes a first modulation terminal having a first capacitive component. A first driver is configured to charge a first set of modulation terminals of the plurality of pixels. A second driver is configured to charge a second set of modulation terminals of the plurality of pixels. A charge transfer circuit is connected between the first set of modulation terminals and the second set of modulation terminals. The charge transfer circuit is configured to transfer charge between the first set of modulation terminals and the second set of modulation terminals.

DETAILED DESCRIPTION OF THE DRAWINGS

Figure 21A:
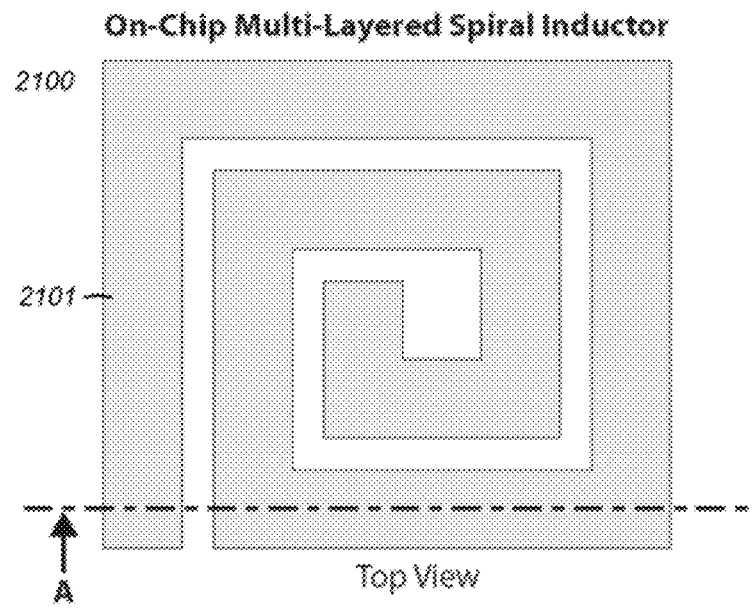
Figure 21B:
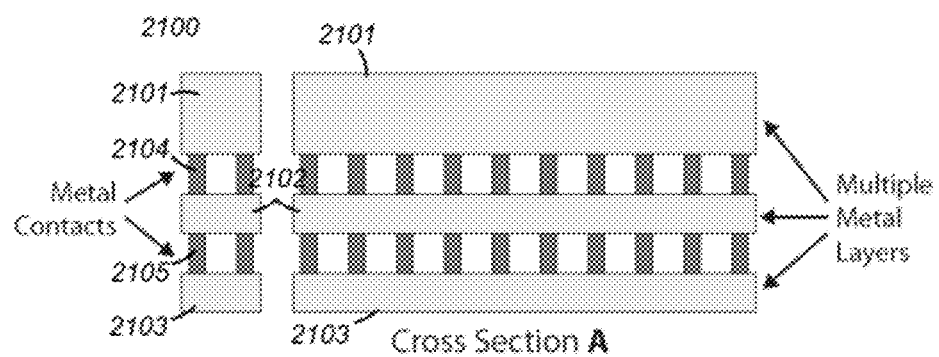

FIGS. 21A-B depict a modified on-chip multilayer inductor layout with multiple vias connecting overlapping metal layers to reduce resistive losses.

DETAILED DESCRIPTION OF THE INVENTION

In order to effectively capture images for range imaging, typical range imaging cameras utilize sensors having differential "two-tap" pixel structures in order to provide high frequency gain modulation. In these sensors, each pixel generally contains two capacitive modulation gates that are driven with complimentary—180° out of phase—digital (square) waveforms. These complimentary waveforms cause each pixel to accumulate detected light alternately in the two regions. While this structure has historically been acceptable, as the frequency of the square waves being used has increased to achieve better distance precision and/or range imaging sensors developed with higher spatial resolution, the amount of power consumed by the pixels has increased dramatically. The high speed modulation—digital switching—can also cause significant transient power supply disturbances which can interfere with other system components. While the capacitive load of each individual modulation gate is small, globally modulating the cumulative capacitance of a full pixel array can demand a considerable amount of power. The average sensor modulation power can be estimated as $P=2NCfV^2$, where N is the number of pixels in the sensor (number of columns multiplied by the number of rows), and f, V, and C are the modulation frequency, voltage, and modulation gate capacitance, respectively. Accordingly, the modulation drive circuit of a typical image sensor having a resolution of 320× 240 pixels and a modest modulation gate capacitance of 20 fF consumes 3.3 W when operating at a voltage of 3.3V and a frequency of 100 MHz. This level of power consumption is prohibitive for use with most battery or USB powered applications, such as cameras, cell phones, laptop, tablet integration, 3D webcams, and hand-held 3D scanners. Furthermore, as new applications require higher frequencies and larger pixel arrays, the power requirements have increased.

The discussion below relies on the differential "two-tap" pixel structure for purposes of describing an embodiment of the invention. However, it should be understand that this pixel structure is not the only pixel structure that could be used with the present invention. For example, instead of two modulation gates per pixel, a pixel could have a single modulate gate. Pixels could then be paired up and modulated in a similar way as discussed below. As another example, pixels could have more than two modulation gates.

Figure 2:
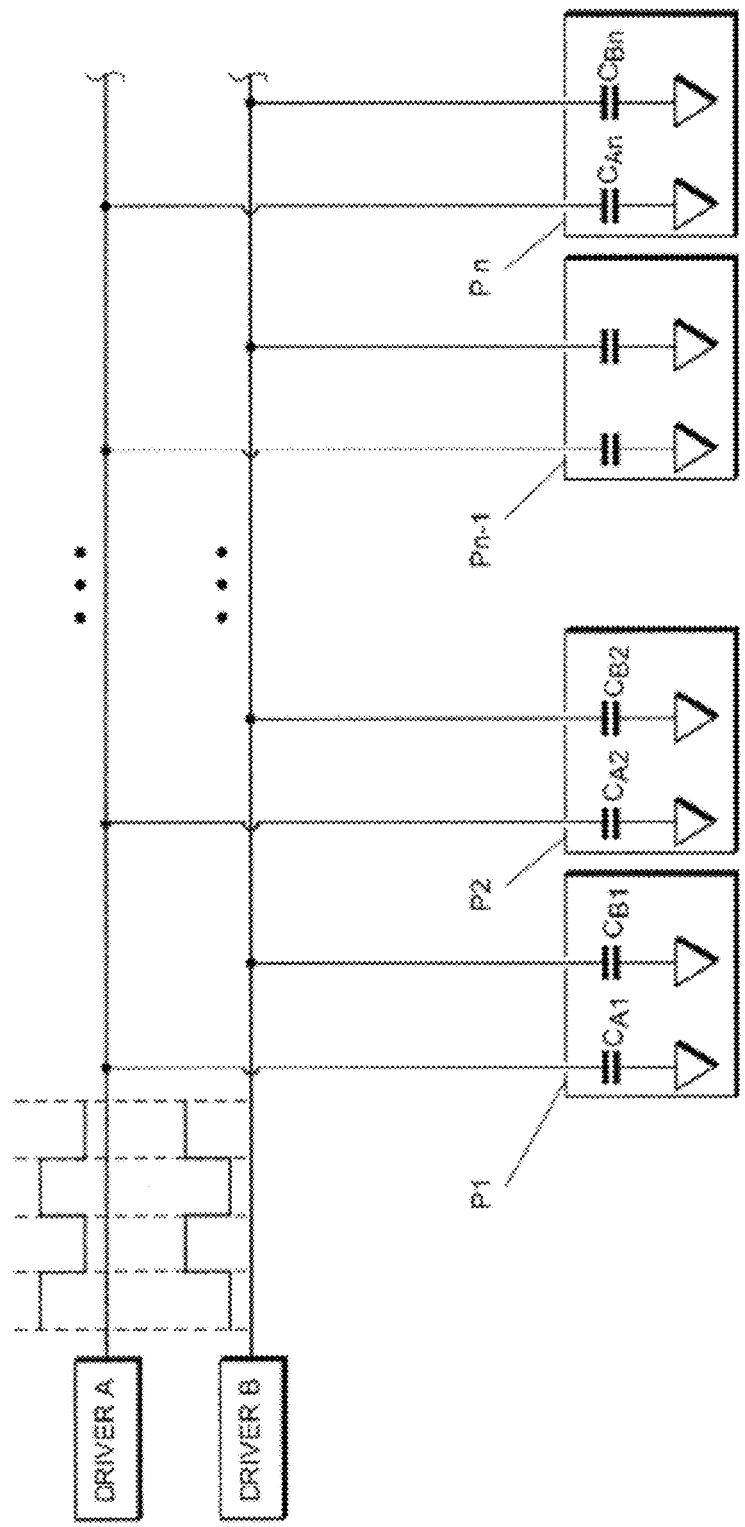
FIG. 2 depicts a simplified diagram of a representative electrical load and clock driver arrangement of a typical pixel structure of an image sensor of a range imaging camera.
Figure 20:
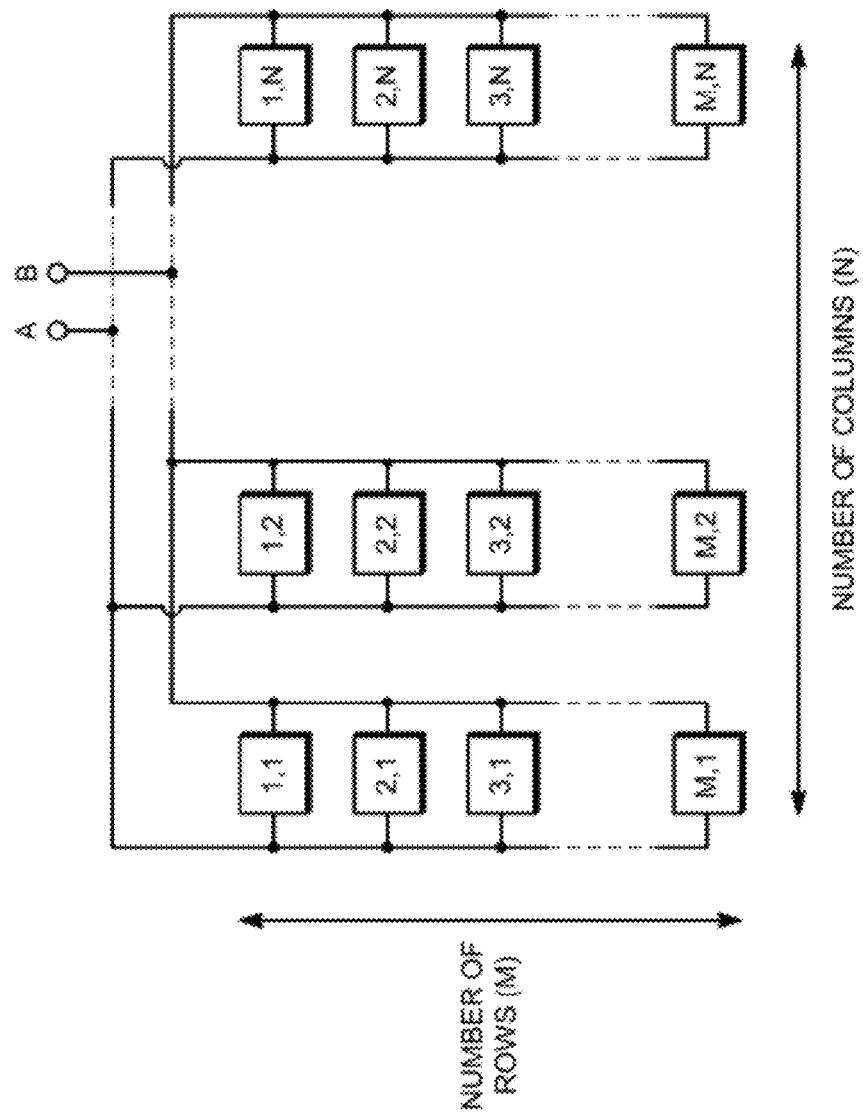
FIG. 20 depicts a pixel array having pixels arranged in M rows and N columns.

In order to more fully understand the cause of the increased power consumption, it is helpful to discuss the structure of the pixel arrays. For power analysis purposes, a typical pixel array can be considered as two separate networks of small capacitors connected in parallel, as shown in FIG. 2. In the example shown in FIG. 2, each of the boxes $P_1$-$P_n$, represents a column of pixels. The total capacitance associated with the modulation of each pixel column is represented in FIG. 2 as a first capacitance $C_{Ax}$ (e.g., the total capacitance due to a first modulation gate in each pixel of the column) and a second capacitance $C_{Bx}$ (e.g., the total capacitance due to a first modulation gate in each pixel of the column), where the "A" group of capacitances is fed by Driver A and the "B" group of capacitances is fed by Driver B. Accordingly, the pixel array will comprise capacitor columns represented by capacitances $C_{A1}$-$C_{An}$, fed by Driver A, and $C_{B1}$-$C_{Bn}$, fed by Driver B. As further shown in FIG. 2, Drivers A and B supply square waveforms to the capacitor groups. These waveforms, as noted above, are 180° out of phase. FIG. 20 depicts an alternate representation of a pixel array having pixels arranged in M rows and N columns.

Figure 3:
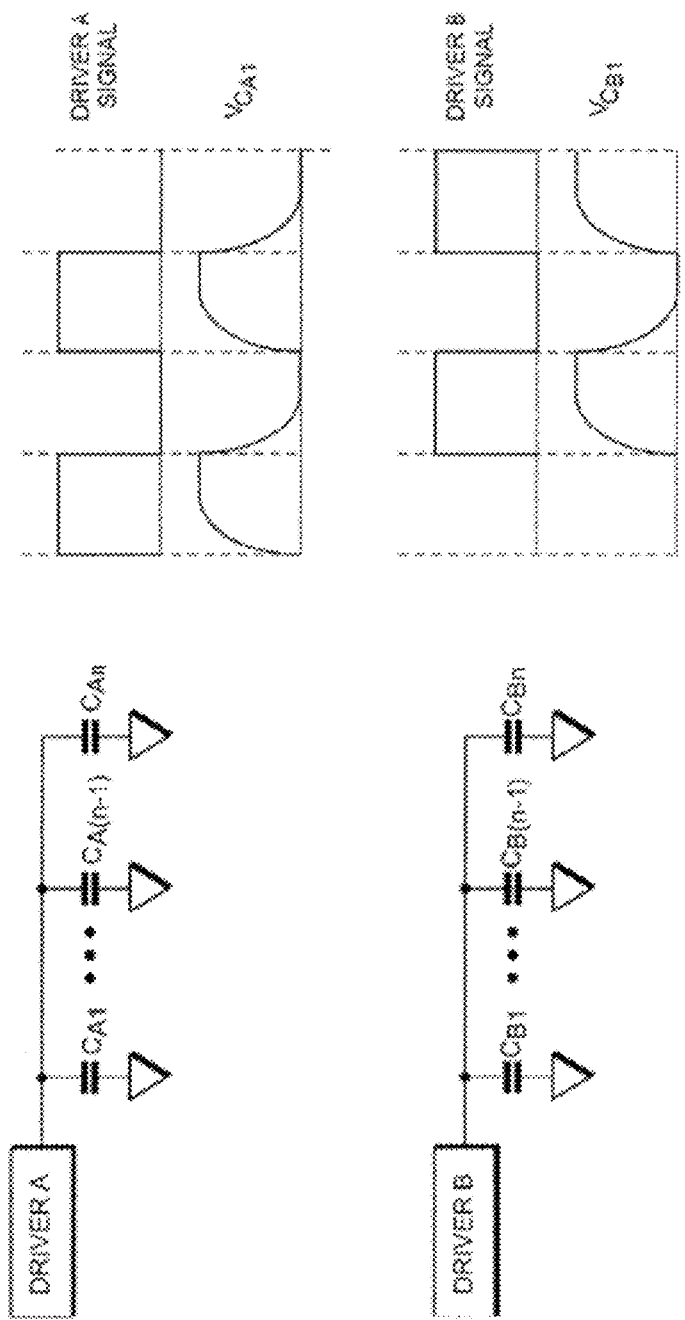
FIG. 3 depicts a simplified diagram showing driver signals and representative voltage responses of the different capacitive regions of the pixels of FIG. 2.

As shown in FIG. 3, when a high voltage signal is supplied to the A group capacitors, the voltage across each of the capacitors increases from zero to the high voltage state in a non-linear manner over time. Similarly, when a low voltage signal is then applied, the voltage of the capacitor decays in a non-linear manner. The B group capacitors behave in a similar manner when driven by Driver B. The rate at which the capacitors charge and discharge (commonly referred to as the RC time constant) depends on the capacitance value and resistance of the physical signal wiring down each column. Ultimately the voltage waveform shape across each capacitor is determined by this (dis)charge rate, and the modulation frequency used. Examples of the voltages across capacitors $C_{A1}$ and $C_{B1}$ are shown in FIG. 3. Accordingly, the pixel array consumes power charging each of the capacitors in the capacitive networks. The total power, P, consumed is therefore proportional to the modulation frequency—the frequency, f, of the square waveforms—and the cumulative capacitance—twice the number of pixels, N, (assuming two modulation gates per pixel) times the pixel capacitance, C, (e.g., the capacitance associated with a modulation gate of the pixel). The total power can be calculated using the formula $P=2NCfV^2$, where V is the amplitude of the square waveforms. With the development of higher spatial resolution range imaging sensors that operate at higher modulation frequencies, it has been discovered that the power consumption due to gain modulation has become an increasingly dominant proportion of total power required by the sensors. As some specialized range imaging sensors require the pixel arrays to be gain modulated (or shuttered) at frequencies of 10-500 MHz (or higher), the power consumption of these sensors has become prohibitive for certain applications. Other specialized range imaging sensors require the pixel arrays to be gain modulated at frequencies of 100-200 MHz. It has also been discovered that the non-sinusoidal voltage responses across the capacitors is detrimental to the proper operation of the range imaging cameras due to the interference of the sensor and illumination modulation signal harmonics which can cause inaccuracies in the distance measurements.

As discussed below, circuit configurations utilizing resonant circuits to gain modulate the pixel arrays can be used to both reduce the power consumed by the pixel array and to improve the voltage response of the capacitive regions of the pixels. As also discussed below, circuit configurations utilizing resonant circuits allow the operative frequencies of the range imaging cameras to be altered in substantially real-time.

In one exemplary embodiment, an inductor is incorporated into the image sensor of a range imaging camera to form a resonant RLC (Resistor-Inductor-Capacitor) tank circuit. In general, when an inductor is connected across a charged capacitor, energy is repeatedly transferred between the electric field of the capacitor and the magnetic field of the inductor. The voltage across the capacitor (capacitance C) therefore oscillates sinusoidally as current flows back and forward through the inductor (inductance L) at a specific resonant frequency ($f_{res}$) given by: $f_{res}=1/(2\pi\sqrt{(LC)})$. Accordingly, the oscillation occurs at a specific resonant frequency, which is determined by the capacitance and inductance values used in the circuit. In an ideal lossless resonant circuit, no power would be consumed as all of the energy would be recycled as the oscillations were sustained indefinitely. However, in all real-world implementations, some of the energy is necessarily dissipated in the resistive wiring of the circuit. This dissipation results in a dampening, and eventual cessation, of the oscillations. In order to sustain the resonant waveform, the lost energy needs to be replenished. This may be done though the use of an external driver circuit.

Figure 4:
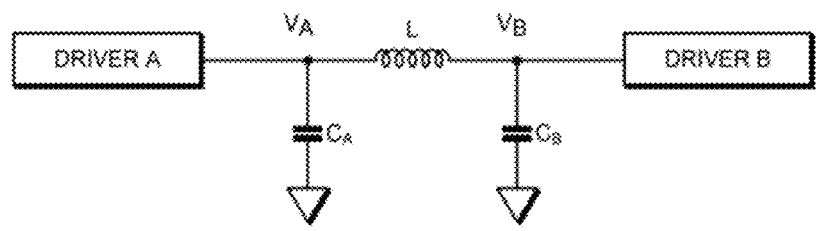
FIG. 4 depicts a simplified circuit diagram of a resonant circuit according to an exemplary embodiment of the invention.
Figure 5:
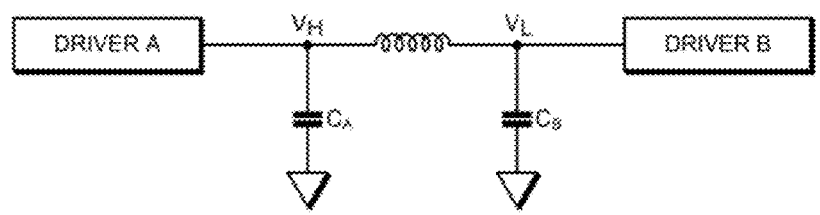
FIG. 5 depicts a first operational state of a resonant circuit according to an exemplary embodiment of the invention.
Figure 6:
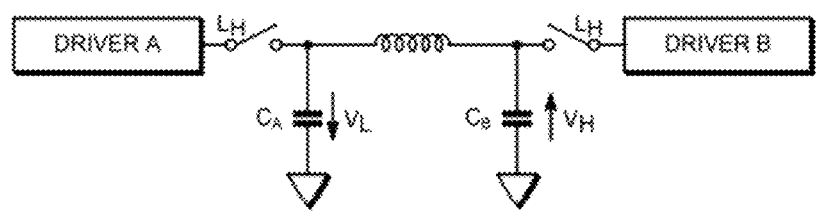
FIG. 6 depicts a second operational state of a resonant circuit according to an exemplary embodiment of the invention.
Figure 7:
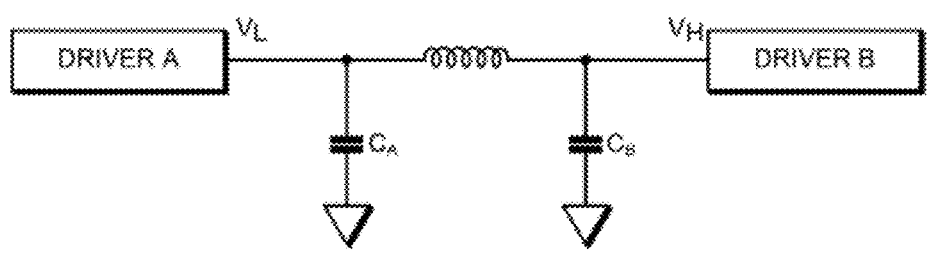
FIG. 7 depicts a third operational state of a resonant circuit according to an exemplary embodiment of the invention.
Figure 8:
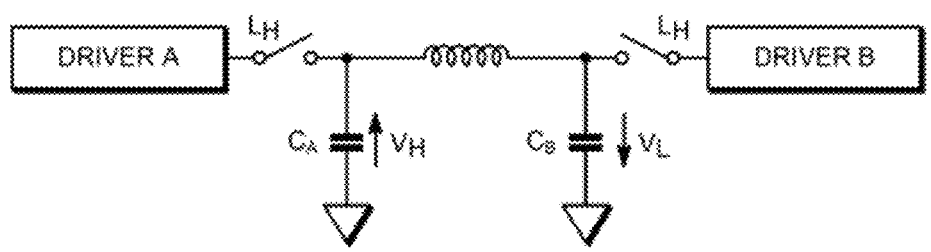
FIG. 8 depicts a fourth operational state of a resonant circuit according to an exemplary embodiment of the invention.

FIG. 4 depicts a simplified schematic of an image sensor according to the present exemplary embodiment that incorporates a differential resonant circuit, which significantly reduce the power consumption of the sensor. The simplified circuit shows the modulation terminals of the pixel array as two distinct capacitive loads A and B. Assuming that each pixel has two modulation gates, $C_A$ is the total capacitance due to the capacitive regions associated one of the modulation gates for each pixel of the pixel array. Similarly, $C_B$ is the total capacitance due to the capacitive regions associated with some of another one of the modulation gates for each pixel of the pixel array. These loads are connected together through an inductor (L). Two driver circuits (Driver A and Driver B) are used to replenish the resonant circuit and sustain modulation as described below and shown in FIGS. 5-9. At the start of a cycle, and as shown in FIG. 5, Driver A outputs a high voltage signal $V_{High}$ to pull capacitive network A up to $V_{High}$. At the same time, Driver B outputs a low voltage signal $V_{Low}$ to pull capacitive network B down to $V_{Low}$. Then, as shown in FIG. 6, Drivers A and B are set to a high-impedance setting, thereby allowing the resonant circuit to oscillate. The high-impedance setting is represented by showing Drivers A and B as disconnected from the circuit. As the circuit begins to oscillate, capacitive network A begins to discharge towards $V_{Low}$ and capacitive network B begins to charge up towards $V_{High}$ through inductor L. Then, after one half of the resonant modulation period, Driver A outputs a low voltage signal $V_{Low}$ to pull capacitive network A down to $V_{Low}$ and Driver B outputs a high voltage signal $V_{High}$ to pull network B up to $V_{High}$, as shown in FIG. 7. Then, as shown in FIG. 8, Drivers A and B are again set to a high-impedance state to allow the resonant circuit to oscillate so that capacitive network A begins to charge up towards $V_{High}$ and capacitive network B begins to discharge towards $V_{Low}$ through inductor L. This process is then repeated after a full resonant modulation period.

While FIG. 6 depicts Drivers A and B as being enabled and disabled with switches external to the drivers, in other examples the drivers may be internally enabled and disabled. For example, tri-state drivers with an output enable ("oe") feature may be used.

Figure 9:
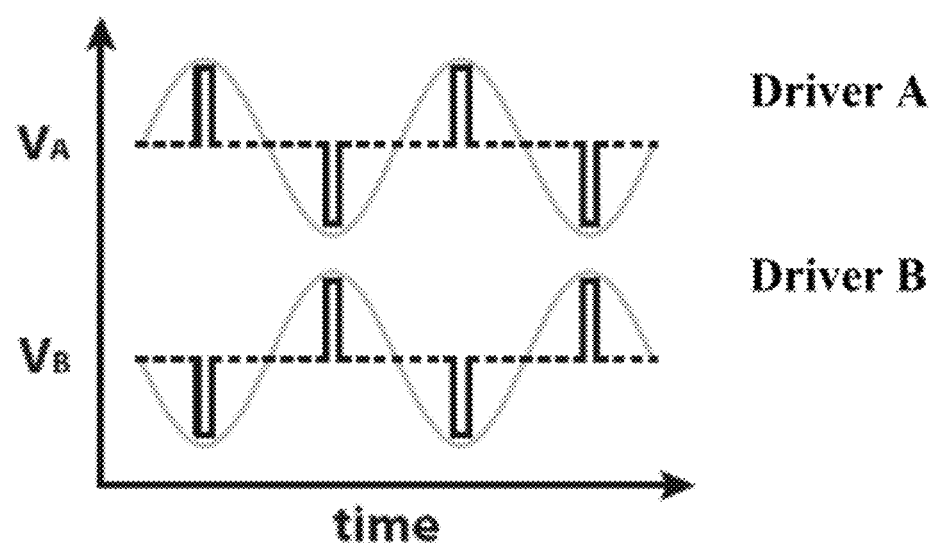
FIG. 9 depicts the representative waveforms of FIGS. 4-8, according to an exemplary embodiment of the invention.

FIG. 9 shows waveforms representing the outputs from Drivers A and B, as well as the voltage response of the capacitive networks, $V_A$ and $V_B$. As a result of incorporating the resonant circuit, significantly less power is necessary to drive the pixel array as compared to existing image sensors. Where traditional image sensors must charge up one capacitive network while dumping and throwing away the energy that was stored in the other, image sensors incorporating the resonant circuit effectively recycle a portion of the stored energy by "pushing" it back and forth between the two capacitors. Optimum power savings are generally achieved when operating at the system resonant frequency ($f_{res}$). Furthermore, the resonant modulation improves the sinusoidal properties of the voltage responses of the capacitive loads as seen by comparing FIGS. 3 and 9. By improving the sinusoidal characteristics of the voltage response, image sensors incorporating the resonant circuit are able to improve measurement linearity of the range imaging cameras.

Figure 18:
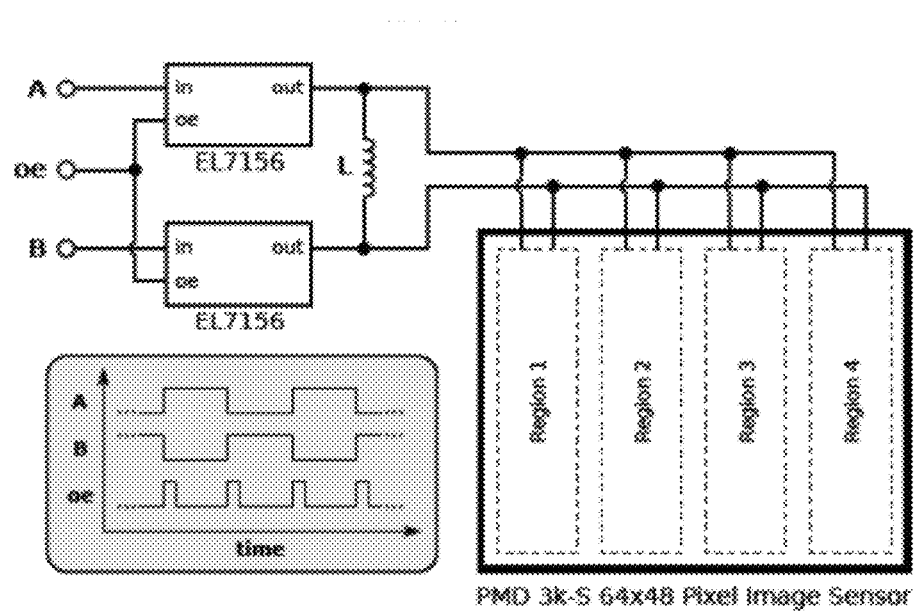
FIG. 18 shows simplified diagram of a device with an off-chip inductor and modulation drivers.
Figure 19:
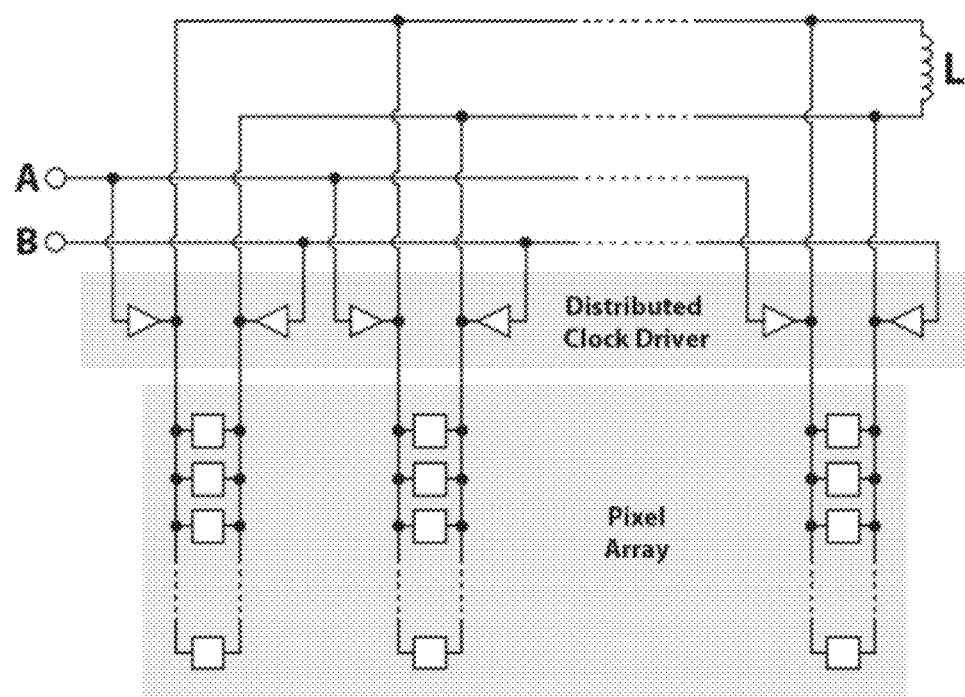
FIG. 19 depicts a simplified schematic diagram of a device having an RLC tank circuit according to an exemplary embodiment of the invention.

The driver circuits may be located "off-chip" or "on-chip." That is, the driver may be located on or off of the same IC chip as the image sensor. In some instances, the driver may be on its own circuit board. On-chip driver configurations can be custom-designed to suit, and can achieve much higher modulation frequencies than off-chip configurations, although off-chip drivers are generally easier to implement with less development effort required. Additionally, the inductor may also be located either on-chip or off-chip as well. In some instances, an off-chip inductor may be added to an existing range imaging camera to achieve a considerable power savings. FIG. 18 shows simplified diagram of a device which is located off-chip. As shown, an output enable ("oe") input is supplied to two drivers to generate the above described tri-state input signals. These signals are connected through an inductor, L, that is located external to the image sensor. FIG. 19 depicts an additional simplified schematic diagram of a device having an on-chip RLC tank circuit according to another exemplary embodiment of the invention. To effectively drive a large capacitive load, a plurality of smaller drivers operating in parallel, distributed across the sensor array provides efficiencies in power distribution and physical layout. Typically, on-chip inductors are formed from planar metal spirals. FIG. 21A depicts a modified on-chip multilayer inductor layout 2100 with multiple vias 2104, 2105 (FIG. 21B) connecting overlapping metal layers 2101, 2102, 2103 (FIG. 21B) to reduce resistive losses and thus improve the energy efficiency.

Figure 10:
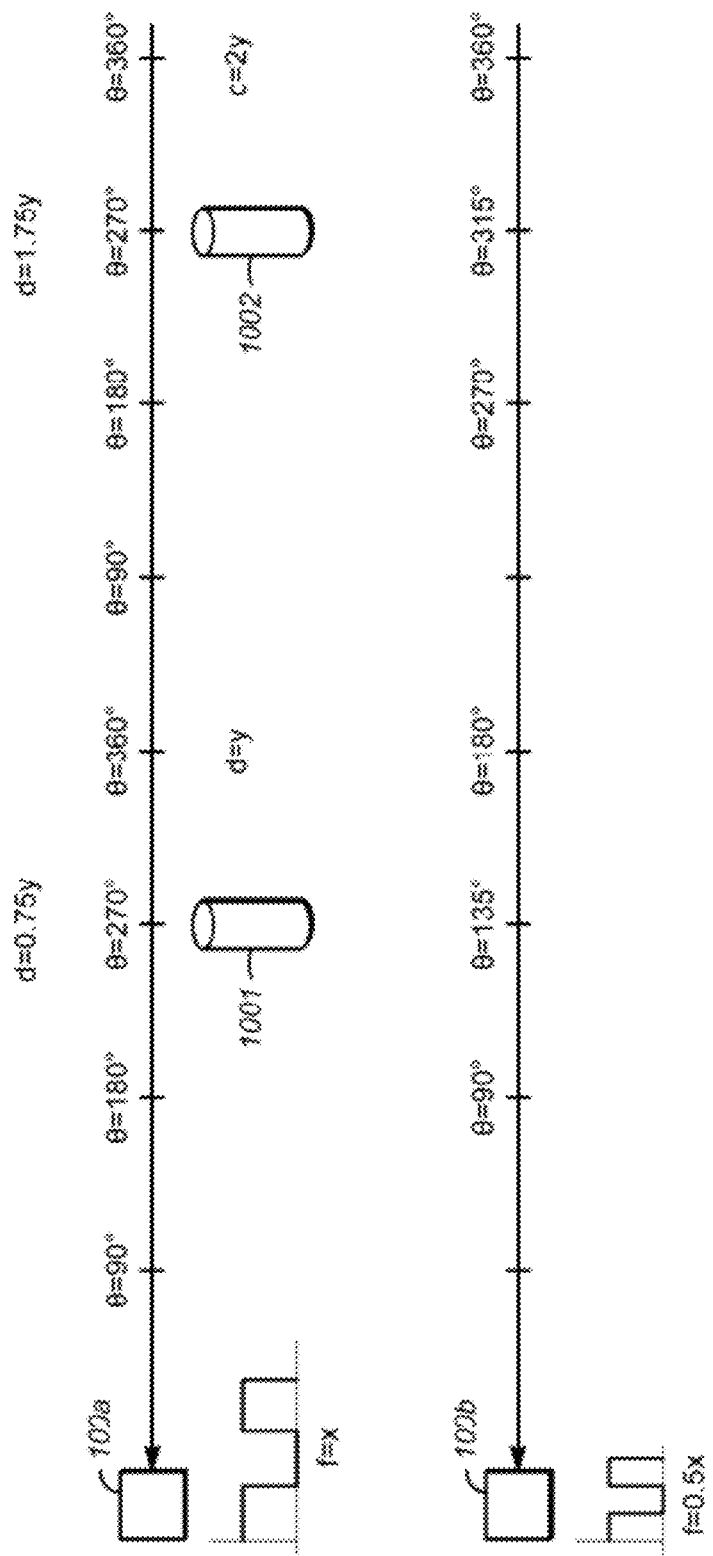
FIG. 10 depicts simplified diagrams showing the relationship between distance and phase shift for two range imaging cameras using different clocking frequencies according to an exemplary embodiment of the invention.

AMCW range imaging cameras having a fixed clock cycle (i.e. a fixed frequency of the square waveforms emitted by the drivers) may encounter difficulties in ranging objects where the distance between the range imaging camera and the objects is such that the reflected light is more than 360° out of phase with the emitted light. As shown in FIG. 10, the phase shift cannot actually be more than 360°. Due to the nature of phase shifting, a phase shift of 360° is identical to a phase shift of 720° and to a phase shift of 0°. Likewise, a phase shift of 270° is identical to a phase shift of 630°. This can create difficulties for typical range imaging cameras because the phase shift of two objects may be identical, and therefore determined to be at the same distance from the camera, when the objects are actually quite far apart. For example, as shown in FIG. 10, when a range imaging camera 100a emits a modulated illumination signal having a frequency x, a distance y may be associated with 360° of phase shift. Light reflected back to the camera from object 1001 will have a phase shift of 270°. Based on the phase shift, the range imaging camera 100a will correctly determine that the object 1001 is located at a distance of 0.75y from the camera. However, light reflected from object 1002 will also have a phase shift of 270°. The range imaging camera 100a will therefore determine that object 1002 is also located at a distance of 0.75y from the camera, when it is actually located at a distance of 1.75y. This may be unacceptable in many applications.

One way to account for this phenomenon is to use a camera with a slower clock cycle. While using a slower clock cycle may reduce the precision of the distance determinations, it will also increase the distance associated with 360° of phase shift, thereby increasing the effective range of the range imaging camera. As further depicted in FIG. 10, a second range imaging camera 100b is used to determine the distances to the objects 1001 and 1002. The second range imaging camera 100b emits a modulated illumination signal having a frequency of 0.5x-one half the operating frequency of the first range imaging camera 100a. By halving the clock cycle, the amount of distance the reflected light has to travel to achieve the same phase shift is effectively doubled. That is, the distance associated with 360° of phase shift is doubled to 2y (as opposed to y) when the frequency is halved. Accordingly, the second range imaging camera will identify the first object 1001 as having a phase shift of 135° and the second object as having a phase shift of 315°. Because both of these phase shifts are under 360°, the second range imaging camera will correctly identify the distances to the objects 1001, 1002 as 0.75y and 1.75y, respectively.

Due to the nature of the resonant circuit, the RLC circuit is balanced according to a single desired frequency. For example, in the circuit of FIG. 4, when a specific resonant frequency, $f_{res}$, is desired, an inductance L of the inductor may be calculated according to the following formula: $L=2/(C_A(2\pi f_{res})^2)$. In light of the above, it may sometimes be preferable to utilize a range imaging camera that is capable of easily switching the frequency of its clock cycles. It may be preferable in some applications to switch the operating frequency in substantially real-time. Thus, in one exemplary embodiment, range imaging cameras utilize resonant circuits in which multiple inductors are switchably connected in series, in parallel, or in various combinations thereof. By so configuring the inductors (or by using a variable inductor), the range imaging cameras may selectively change the resonant frequency of the RLC circuits to accommodate various clocking frequencies. Other circuit arrangements could be used to create a frequency spectra with more than one resonant peak, thus offering multiple optimum operating frequencies without the need to change the circuit configuration.

As discussed above, the driver pulses used to replenish the lost energy occur in every cycle. In an alternate configuration, the driver pulses may occur on alternate resonant cycles, skipping one or more cycles, to achieve further power savings. Dampening due to circuit inefficiencies will result in a decay of the resonance drive signal amplitude. However, this decay may not impact system performance for several cycles.

Further arrangements may take advantage of the decaying of the resonant oscillations over time, by skipping drive pulses and allowing a circuit to resonate for a number of cycles to achieve in a signal with a superimposed lower frequency envelope. This will effectively amplitude modulate the resonant drive signal. Multiple frequency operation may therein be achieved by taking measurements at both the upper and lower sidebands of this modulated resonant signal, as well as the resonant frequency itself. A phase or timing adjustment in the drive signals may also be introduced during the image integration time to suppress at least one of the sideband frequencies, in a manner similar to a known "phasing method" of single-sideband amplitude modulation, but instead using the integration time as the summation process.

Figure 1:
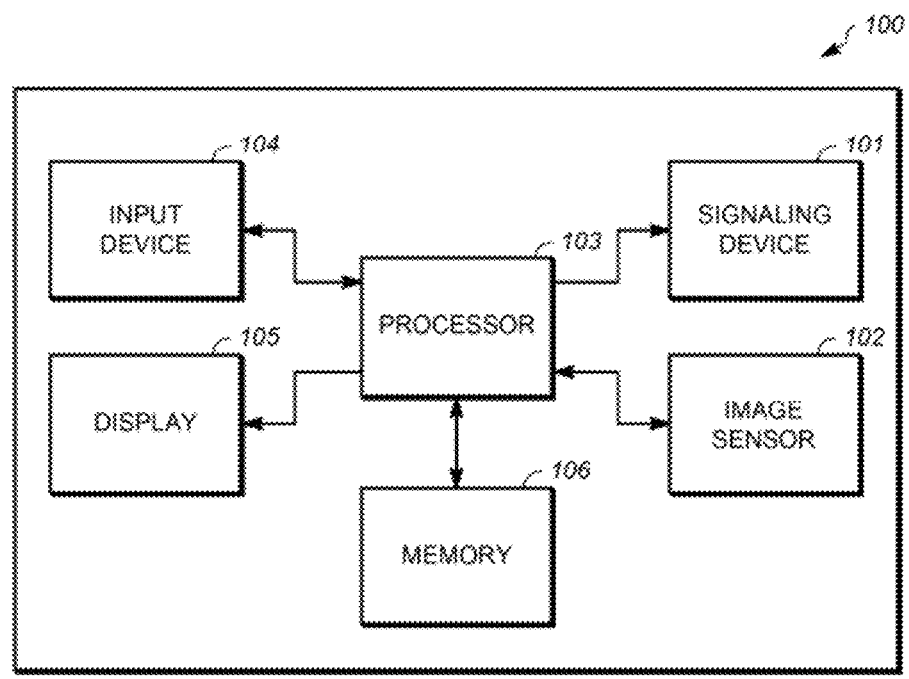
FIG. 1 depicts a schematic diagram of a standard imaging device.
Figure 11:
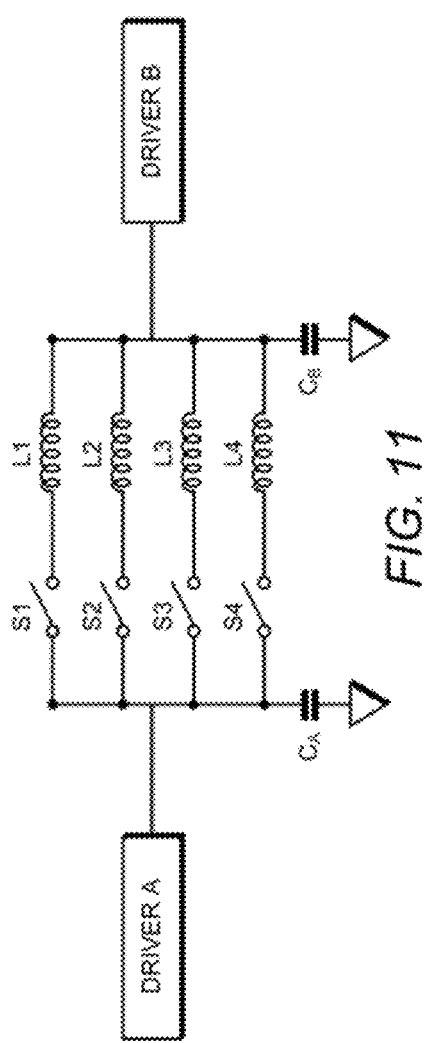
FIG. 11 depicts a resonant circuit utilizing multiple inductors connected in parallel according to an exemplary embodiment of the invention.
Figure 12:
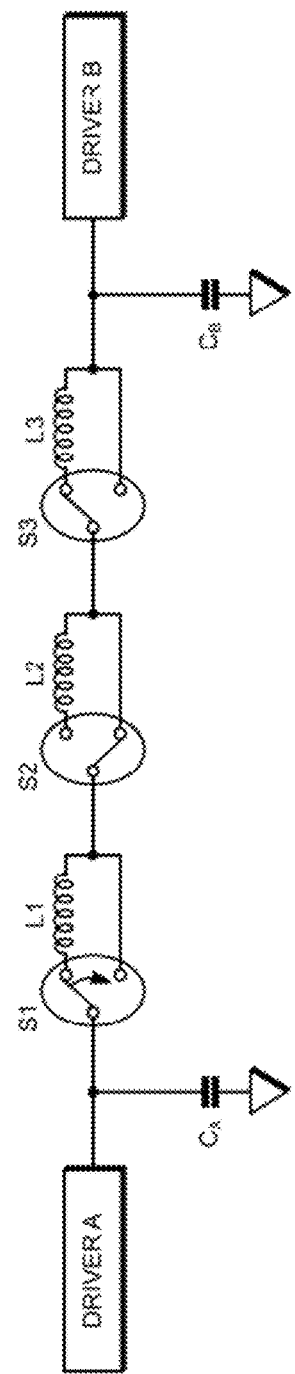
FIG. 12 depicts a resonant circuit utilizing multiple inductors connected in series according to an exemplary embodiment of the invention.
Figure 13:
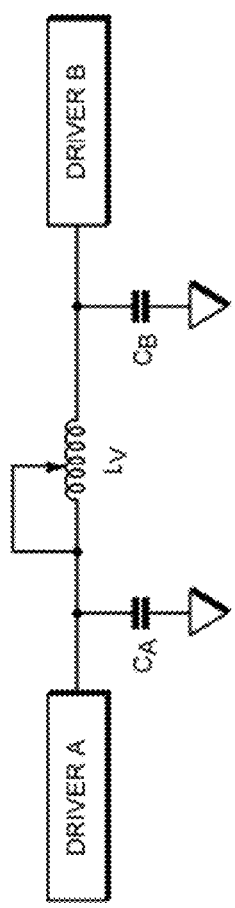
FIG. 13 depicts a resonant circuit utilizing a variable inductor according to an exemplary embodiment of the invention.

FIGS. 11 and 12 depict one exemplary embodiment in which multiple inductors $L_1$-$L_4$ are arranged in parallel and in series, respectively. As shown in the figures, switches $S_1$-$S_4$ may be selectively operated to achieve various inductances so as to tune the resultant RLC circuits to various resonant frequencies. These frequencies coincide with desired clocking frequencies supplied by Drivers A and B. FIG. 13 depicts another exemplary embodiment in which a variable inductor $L_V$ is used to tune the RLC circuit to various resonant frequencies in a similar manner. It should be recognized that the switching may be performed by the processor shown in FIG. 1, by a separate processor, or by some other equivalent device. It should also be recognized that mutual inductive coupling may provide additional electrical and physical layout efficiencies.

Figure 14:
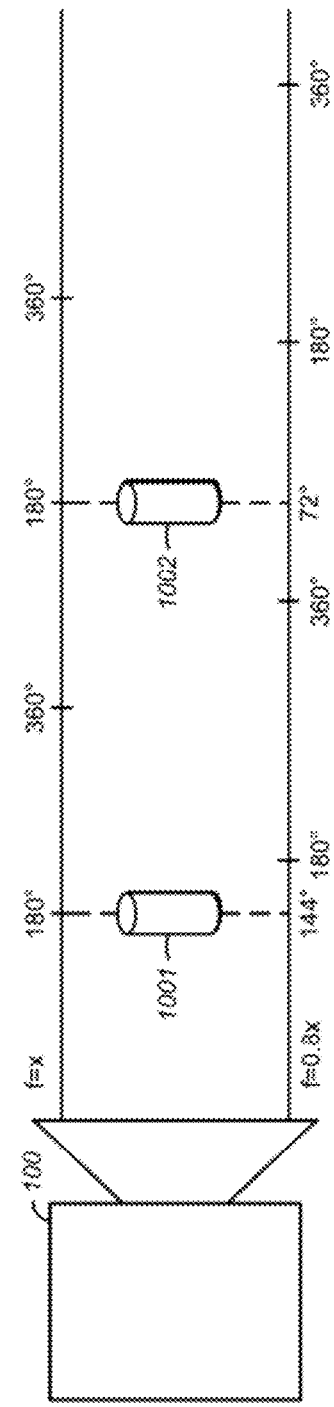
FIG. 14 depicts a range imaging camera utilizing differently modulated illumination signals according to an exemplary embodiment of the invention.

A range imaging camera may first attempt to image a scene using one frequency and then attempt to image the same scene using a second frequency. The different frequencies will result in objects placed at the same distances having different degrees of phase shift. Consequently, the range imaging camera will be able to use these differing phase shifts to determine the correct distances to the objects. FIG. 14 depicts an exemplary embodiment using two different frequencies. The range imaging camera 100 uses a first signal having a clocking frequency of x. The reflected signals from objects 1001 and 1002 both indicate a phase shift of 180°. The range imaging camera 100 then emits a second signal having a clocking frequency of 0.8x. The reflected signals now indicate that object 1001 has a phase shift of 144°, while the object 1002 has a phase shift of 72°. Based on standard calculations, the range imaging camera can correctly determine the distances to the objects based on this information. At each frequency the processor can determine a set of candidate distances separated by the distance relating to a 360° phase shift for each particular operating frequency. The processor then compares the set of candidate frequencies, finding the two distances that have the smallest difference, and averaging those to compute the true distance. It should be recognized that the range imaging camera may utilize two or more sources to simultaneously or alternately emit the modulated illumination signals. Similarly, exemplary cameras may use additional image sensors.

Figure 15:
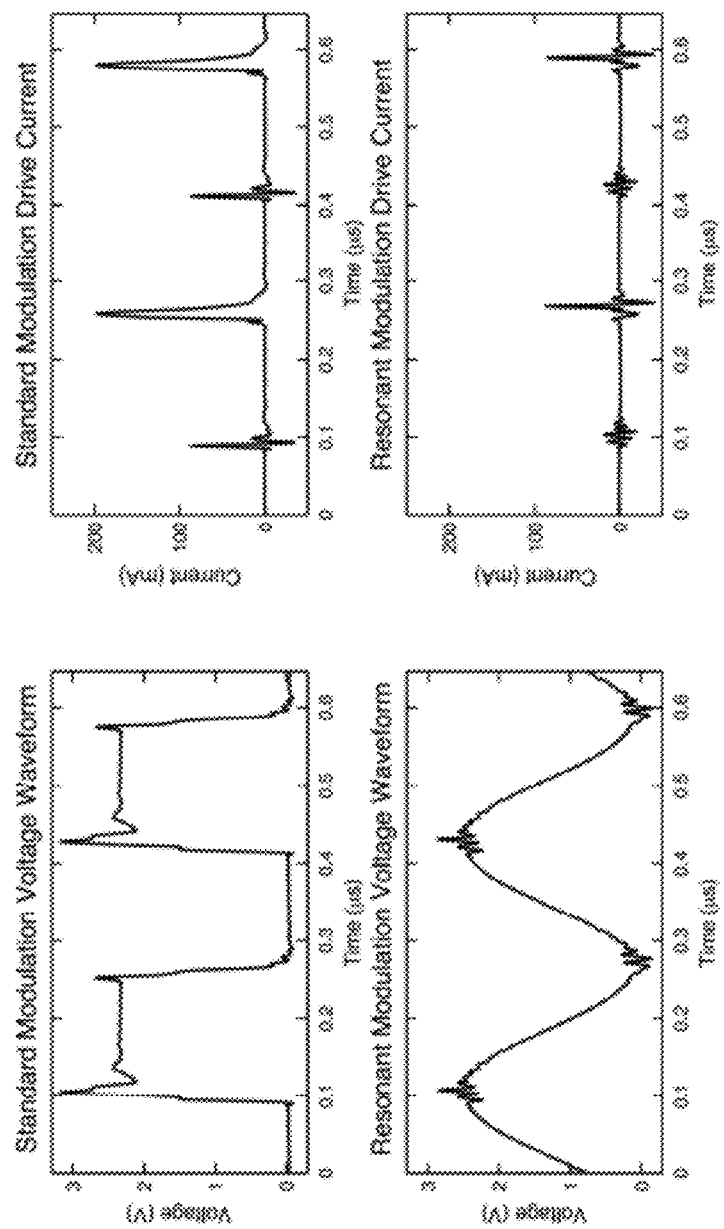
FIG. 15 depicts comparisons of both voltage and current over time between a device according to an exemplary embodiment of the invention and a known device.
Figure 16:
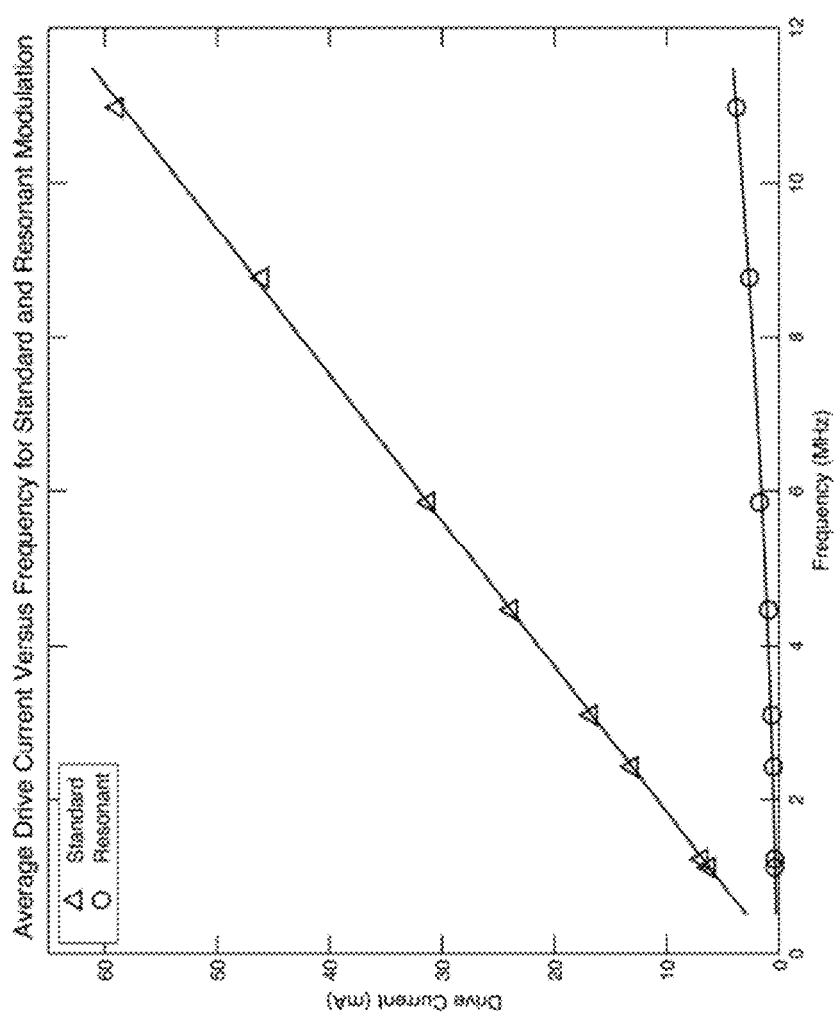
FIG. 16 depicts the average modulation drive current versus frequency, for a known device and a device according to an embodiment of the invention.
Figure 17:
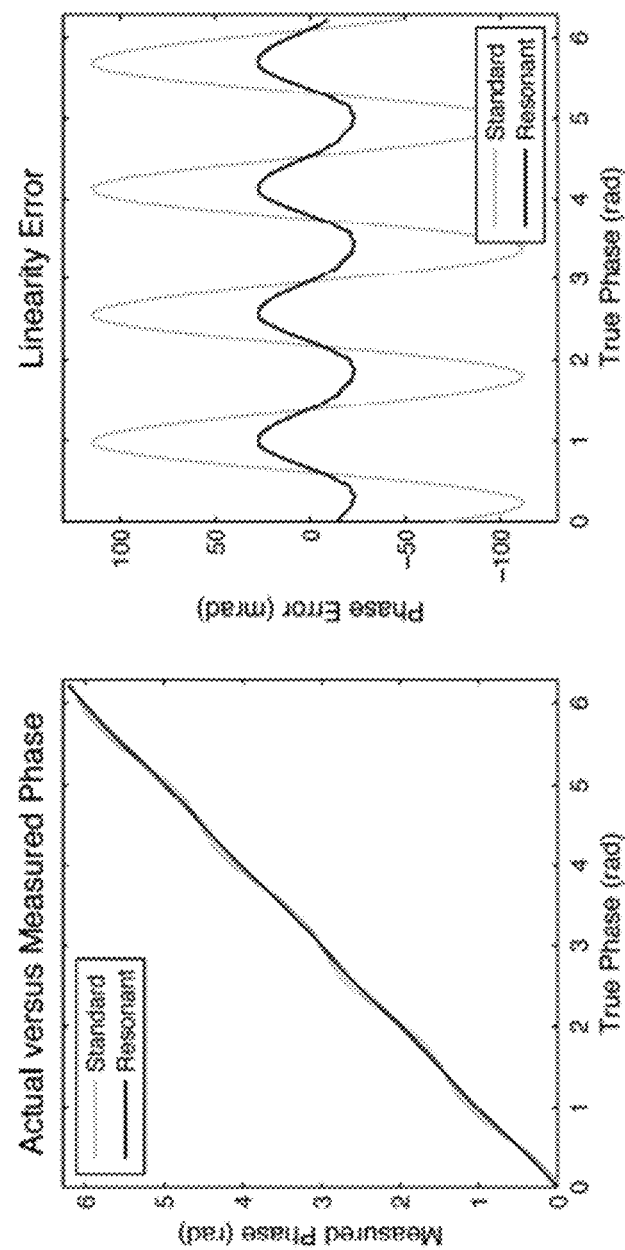
FIG. 17 depicts a comparison of actual and measured phase and resulting linearity error for a known device and a device according to an embodiment of the invention.

FIG. 15 shows comparisons of both voltage and current over time between a device according to an embodiment of the invention and a known device at an operating frequency of 3.1 MHz. As shown in the figure, the large drive current spikes present in the standard mode are considerably reduced in the resonant configuration, resulting in significant power savings. As shown in FIG. 16, which shows the average modulation drive current versus frequency, for both a known device and a device according to an embodiment of the invention, a 93-96% reduction in modulation drive power has been achieved over a range of frequencies from 1-11 MHz. This accounts for a significant reduction in the total power consumption of the tested image sensors. Because the electrical waveform shape of the exemplary output is inherently different from that of a standard device, it is also helpful to evaluate the optical response and imaging performance for both devices. Among the various metrics available, range accuracy (or linearity) is predominantly influenced by modulation waveform shape. The actual versus measured phase and resulting linearity error—at a single modulation frequency—is shown in FIG. 17. In this example, the exemplary device exhibited a 79% reduction in RMS linearity error compared to the previously known device. Similar results were achieved over all the test frequencies. The system that produced these results is depicted in FIG. 18. Two discrete driver ICs provided the modulation inputs to an off-the-shelf range imaging sensor. To generate the resonant modulation signals a discrete off-chip inductor was connected between the driver outputs and the drivers were operated in a tri-state configuration by pulsing their output enable ("oe") inputs. Given the capacitance value of the sensor, a range of different inductors were selected from 0.33-33 uH in order to achieve resonant modulation frequencies ranging between 1-11 MHz.

In the preceding description, reference is made to the accompanying drawings in which embodiments of the invention are shown by way of illustration. Although embodiments of this invention have been fully described with reference to the drawings, it is to be noted that various changes and modifications will become apparent to those skilled in the art. Such changes and modifications are to be understood as being included within the scope of embodiments of this invention as defined by the appended claims.

What is claimed is:

1. An amplitude modulated continuous wave range imaging device, comprising:
   a signaling device configured to emit an intensity modulated illumination signal;
   an image sensor configured to capture a plurality of images of a reflection of the modulated illumination signal, wherein the captured images include intensity and/or phase components for a plurality of pixels of the image sensor, wherein each pixel includes a first modulation terminal having a first capacitive component;
   a first driver configured to charge a first set of modulation terminals of the plurality of pixels; a second driver configured to charge a second set of modulation terminals of the plurality of pixels, wherein the first set and the second set are mutually exclusive;
   a charge transfer circuit connected between the first set of modulation terminals and the second set of modulation terminals, wherein the charge transfer circuit is configured to transfer charge between the first set of modulation terminals and the second set of modulation terminals; and
   a processor configured to determine a phase shift between the emitted modulated illumination signal and the captured images at each of the plurality pixels.

2. The amplitude modulated continuous wave range imaging device of claim 1, wherein each of the plurality of pixels also includes a second modulation terminal having a second capacitive component, wherein the first set of modulation terminals includes the first modulation terminal of each of the plurality of pixels, and wherein the second set of modulation terminals includes the second modulation terminal of each of the plurality of pixels.

3. The amplitude modulated continuous wave range imaging device of claim 2, wherein the total average power required to charge and discharge the first and second sets of modulation terminals is less than 75% of $MNCfV^2$, where M is the number of modulation terminals per pixel, N is the number of pixels in the plurality of pixels, f is the frequency of the emitted modulated illumination signal, V is voltage of the first set of modulation terminals after the first set of modulation terminals have been fully charged, and C is the capacitance of the modulation terminals.

4. The amplitude modulated continuous wave range imaging device of claim 1, wherein the charge transfer circuit includes at least one inductor connected between the first set of modulation terminals and the second set of modulation terminals to form a resonant circuit.

5. The amplitude modulated continuous wave range imaging device of claim 4, wherein the at least one inductor comprises a plurality of inductors connected in series, wherein a switch is connected with one inductor of the plurality of inductors, and wherein the processor is configured to control the switch to selectively remove the one inductor of the plurality of inductors from the resonate circuit.

6. The amplitude modulated continuous wave range imaging device of claim 4, wherein the at least one inductor comprises a plurality of inductors connected in series, wherein a switch is connected with one inductor of the plurality of inductors, and wherein the processor is configured to control the switch to selectively remove the one inductor of the plurality of inductors from the resonate circuit.

7. The amplitude modulated continuous wave range imaging device of claim 4, wherein the at least one inductor is a variable inductor.

8. The amplitude modulated continuous wave range imaging device of claim 7, wherein the processor is configured to control the inductance of the variable inductor.

9. The amplitude modulated continuous wave range imaging device of claim 7, wherein the processor is further configured to set the resonate frequency based upon an approximation of a distance to an object and to determine a distance to the object based on the phase shift.

10. The amplitude modulated continuous wave range imaging device of claim 4, wherein the processor is further configured to set a resonate frequency of the resonate circuit and to set a frequency of the modulated illumination signal.

11. The amplitude modulated continuous wave range imaging device of claim 1, wherein the first driver is a tri-state driver and the second driver is a tri-state driver.

12. An amplitude modulated continuous wave range imaging device, comprising:
   a signaling device configured to emit an intensity modulated illumination signal;
   an image sensor configured to capture a plurality of images of a reflection of the modulated illumination signal, wherein the captured images include intensity and/or phase components for at least one pixel of the image sensor, wherein the at least one pixel includes a first modulation terminal having a first capacitive component and a second modulation terminal having a second capacitive component;
   a first driver configured to charge the first modulation terminal;
   a second driver configured to charge the second modulation terminal;
   a charge transfer circuit connected between the first modulation terminal and the second modulation terminal, wherein the charge transfer circuit is configured to transfer charge between the first modulation terminal and the second modulation terminal; and
   a processor configured determine a phase shift between the emitted illumination modulation signal and the captured images at the at least one pixel.

13. A method of amplitude modulated continuous wave range imaging, the method comprising:
   emitting a modulated illumination signal;
   receiving reflections of the modulated illumination signal on an image sensor;
   capturing a plurality of images of the reflections on the image sensor, wherein the images include an intensity component and a phase component for a plurality of pixels of the image sensor, and wherein each pixel includes a first modulation terminal having a first capacitive component;
   charging a first set of modulation terminals of the plurality of pixels;
   charging a second set of modulation terminals of the plurality of pixels using some of the charge from the first set of modulation terminals of the pixels, wherein the first set and the second set are mutually exclusive; and
   determining a phase shift between the modulated illumination signal and the captured images at each of the plurality of pixels.

14. The method of claim 13, wherein each of the plurality of pixels also includes a second modulation terminal having a second capacitive component, wherein the first set of modulation terminals includes the first modulation terminal of each of the plurality of pixels, and wherein the second set of modulation terminals includes the second modulation terminal of each of the plurality of pixels.

15. The method of claim 14, wherein some charge from the first set of modulation terminals is transferred to the second set of modulation terminals using a charge transfer circuit connected between the first set of modulation terminals and the second set of modulation terminals.

16. The method of claim 15, wherein the charge transfer circuit includes an inductor and charging the second set of modulation terminals includes transferring charge from the first set of modulation terminals through the inductor to the second set of modulation terminals.

17. The method of claim 15, further comprising:
changing the configuration of the charge transfer circuit connecting the first set of modulation terminals and the second set of modulation terminals.

18. The method of claim 17, wherein changing the configuration of the charge transfer circuit includes activating a switch or deactivating a switch.

19. The method of claim 17, wherein changing the configuration of the charge transfer circuit includes activating a plurality of switches or deactivating a plurality of switches.

20. The method of claim 14, further comprising:
enabling a first driver to charge the first set of modulation terminals;
enabling a second driver to charge the second set of modulation terminals;
disabling the first driver to charge the first set of modulation terminals; and
disabling the second driver to charge the second set of modulation terminals.

21. A non-transitory computer-readable medium encoded with a computer program code for amplitude modulated continuous wave range imaging, the program code comprising instructions for:
causing a modulated illumination signal to be emitted;
causing an image sensor to capture a plurality of images of reflections of the modulated illumination signal, wherein the images include an intensity component and/or a phase component for a plurality of pixels of the image sensor, and wherein each pixel includes a first modulation terminal having a first capacitive component;
causing a first driver to charge a first set of modulation terminals;
causing a second driver to charge a second set of modulation terminals, wherein the second set of modulation terminals are also charged by some of the charge from the first set of modulation terminals; and
determining a phase shift between the modulated illumination signal and the captured images at each of the plurality of pixels.

22. The computer-readable medium of claim 21, wherein each of the plurality of pixels also includes a second modulation terminal having a second capacitive component, wherein the first set of modulation terminals includes the first modulation terminal of each of the plurality of pixels, and wherein the second set of modulation terminals includes the second modulation terminal of each of the plurality of pixels.

23. The computer-readable medium of claim 22, wherein the computer program code further comprises instructions for:
changing the configuration of a charge transfer circuit connecting the first set of modulation terminals and the second set of modulation terminals.

24. The computer-readable medium of claim 23, wherein changing the configuration of the charge transfer circuit includes activating a switch or deactivating a switch.

25. The computer-readable medium of claim 23, wherein changing the configuration of the charge transfer circuit includes activating a plurality of switches or deactivating a plurality of switches.

26. The computer-readable medium of claim 22, wherein the computer program code further comprises instructions for:
enabling a first driver to charge the first set of modulation terminals;
enabling a second driver to charge the second set of modulation terminals;
disabling the first driver to charge the first set of modulation terminals; and
disabling the second driver to charge the second set of modulation terminals.

* * * * *